United States Patent
George et al.

(10) Patent No.: US 9,870,250 B2
(45) Date of Patent: *Jan. 16, 2018

(54) AUTOMATED EXPLOITATION OF VIRTUAL MACHINE RESOURCE MODIFICATIONS

(71) Applicant: International Business Machines Corporation, Armonk, NY (US)

(72) Inventors: Manu T. George, Bangalore (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/067,214

(22) Filed: Mar. 11, 2016

(65) Prior Publication Data

US 2016/0196166 A1 Jul. 7, 2016

Related U.S. Application Data

(63) Continuation of application No. 14/830,929, filed on Aug. 20, 2015, now Pat. No. 9,569,269, which is a (Continued)

(51) Int. Cl.
*G06F 9/455* (2006.01)
*G06F 9/50* (2006.01)
(Continued)

(52) U.S. Cl.
CPC ........... *G06F 9/45558* (2013.01); *G06F 8/61* (2013.01); *G06F 9/45533* (2013.01);
(Continued)

(58) Field of Classification Search
CPC .................................................. G06F 9/5077
(Continued)

(56) References Cited

U.S. PATENT DOCUMENTS 5,920,700 A * 7/1999 Gordon ............... G06F 3/0607
709/226
6,075,938 A * 6/2000 Bugnion ............... G06F 9/544
703/27
(Continued)

FOREIGN PATENT DOCUMENTS

WO 2014035309 A1 3/2014

OTHER PUBLICATIONS

Lim, Harold C., et al. "Automated control in cloud computing: challenges and opportunities." Proceedings of the 1st workshop on Automated control for datacenters and clouds. ACM, 2009. pp. 13-18.* Kallahalla, Mahesh, et al. "SoftUDC: A software-based data center for utility computing." Computer 37.11 (2004): pp. 38-46.* Xiao, Zhen, Weijia Song, and Qi Chen. "Dynamic resource allocation using virtual machines for cloud computing environment." IEEE transactions on parallel and distributed systems 24.6 (2013): pp. 1107-1117.*

(Continued)

*Primary Examiner* — Satish Rampuria
(74) *Attorney, Agent, or Firm* — Alexander G. Jochym

(57) ABSTRACT

At least one application in a distributed computing environment is deployed. At least one resource of a virtual machine is provided to the at least one application in the distributed computing environment. The at least one resource of the virtual machine provided is recorded in metadata and the at least one application receives the metadata and using the metadata the at least one application determines how much of the at least one resource of the virtual machine to utilize. A change to the at least one resource of the virtual machine is determined. Responsive to determining the change to the at least one resource of the virtual machine, the metadata is modified. The at least one application uses the modified metadata to determine how much of the changed at least one resource of the virtual machine to use.

10 Claims, 5 Drawing Sheets

Related U.S. Application Data continuation of application No. 14/575,149, filed on Dec. 18, 2014, now Pat. No. 9,329,907.

(51) Int. Cl.
*H04L 29/08* (2006.01)
*G06F 9/445* (2006.01)

(52) U.S. Cl.
CPC ........ *G06F 9/45545* (2013.01); *G06F 9/5016* (2013.01); *G06F 9/5077* (2013.01); *G06F 9/5083* (2013.01); *H04L 67/10* (2013.01); *H04L 67/12* (2013.01); *H04L 67/125* (2013.01); *H04L 67/32* (2013.01); *G06F 9/44505* (2013.01); *G06F 2009/4557* (2013.01); *G06F 2009/45591* (2013.01); *G06F 2009/45595* (2013.01)

(58) Field of Classification Search
USPC ..................................................... 718/1–108
See application file for complete search history.

(56) References Cited

U.S. PATENT DOCUMENTS

| | | | | |
|---|---|---|---|---|
| 6,985,937 | B1* | 1/2006 | Keshav | G06F 9/505 370/231 |
| 8,239,557 | B2 | 8/2012 | McCune et al. | |
| 8,739,157 | B2 | 5/2014 | Ho et al. | |
| 9,703,609 | B2* | 7/2017 | Ferris | G06F 9/5072 |
| 2003/0237097 | A1 | 12/2003 | Marshall et al. | |
| 2008/0163171 | A1* | 7/2008 | Chess | G06F 9/5077 717/120 |
| 2009/0254971 | A1 | 10/2009 | Herz et al. | |
| 2010/0146553 | A1 | 6/2010 | Lo et al. | |
| 2010/0235831 | A1 | 9/2010 | Dittmer | |
| 2012/0227058 | A1 | 9/2012 | Hunt et al. | |
| 2012/0278179 | A1 | 11/2012 | Campbell et al. | |
| 2012/0278330 | A1 | 11/2012 | Campbell et al. | |
| 2012/0278331 | A1 | 11/2012 | Campbell et al. | |
| 2014/0137244 | A1 | 5/2014 | Banerjee et al. | |
| 2015/0040127 | A1 | 2/2015 | Dippenaar et al. | |

OTHER PUBLICATIONS

Soror et al. "Automatic Virtual Machine Configuration for Database Workloads", ACM Transactions on Database Systems • Feb. 2010 DOI: 10.1145/1670243.1670250 • Source: DBLP, SIGMOD'08, Jun. 9-12, 2008, Vancouver, BC, Canada. Copyright 2008 ACM 9781605581026/08/06, Printed Oct. 4, 2016, 15 Pages.

Armbrust et al., "A View of Cloud Computing", Communications of the ACM, vol. 53 No. 4, pp. 50-58 10.1145/1721654.1721672, © 2010 ACM 0001-0782/10/0400, Printed Oct. 4, 2016.

Wei et al., "Managing Security of Virtual Machine Images in a Cloud Environment", CCSW'09, Nov. 13, 2009, Chicago, Illinois, USA., Copyright 2009 ACM 978-1-60558-784-4/09/1, pp. 91-96, Printed Oct. 4, 2016.

George et al., "Automated Exploitation of Virtual Machine Resource Modifications", U.S. Appl. No. 15/353,856, filed Nov. 17, 2016, pp. 1-29.

IBM Appendix P, "List of IBM Patents or Patent Applications to be treated as Related", dated Mar. 9, 2017, 2 pages.

George et al., "Automated Exploitation of Virtual Machine Resource Modifications", U.S. Appl. No. 14/575,149, filed Dec. 18, 2014, 30 Pages.

George et al., "Automated Exploitation of Virtual Machine Resource Modifications", U.S. Appl. No. 14/830,929, filed Aug. 20, 2015, 30 Pages.

Keahey et al., "Virtual Workspaces:Achieving Quality of Service and Quality of Life in the Grid", Accepted for publication in the Scientific Programming Journal 2006, pp. 1-12, <http://www.nimbusproject.org/files/VW_ScientificProgrammingJournal06.pdf>, Last printed Feb. 4, 2016.

Xiao et al., "Dynamic Resource Allocation Using Virtual Machines for Cloud Computing Environment", IEEE Transactions on Parallel and Distributed Systems, vol. 24, No. 6, Jun. 2013, p. 1, <http://ieeexplore.ieee.org/stamp/stamp.jsp?tp=&arnumber=6311403>, Last printed Feb. 4, 2016 3:43 PM.

Zhao et al., "Dynamic Memory Balancing for Virtual Machines", VEE'09, Mar. 11-13, 2009, Washington, DC Copyright © 2009 ACM pp. 1-12, <http://delivery.acm.org/10.1145/1510000/1508297/p21-zhao.pdf>, Last printed Feb. 4, 2016.

* cited by examiner

AUTOMATED EXPLOITATION OF VIRTUAL MACHINE RESOURCE MODIFICATIONS

BACKGROUND OF THE INVENTION

The present invention relates generally to the field of platform as a service, and more particularly to optimization of changes to cloud recourses in a platform as a service environment.

In a cloud environment, Platform As A Service (PAAS) refers to the ability to a expose a platform, such as a Web Serving platform which includes an application server, database, messaging server, etc., as a service so that business users are devoid of platform management. Instead, the business users can solely concentrate on the business applications that are deemed to run on the platform.

SUMMARY

Embodiment of the present invention include a method, computer program product, and system for automated exploitation of virtual machine resource modifications. In one embodiment, at least one application in a distributed computing environment is deployed. At least one resource of a virtual machine is provided to the at least one application in the distributed computing environment. The at least one resource of the virtual machine provided is recorded in metadata and the at least one application receives the metadata and using the metadata the at least one application determines how much of the at least one resource of the virtual machine to utilize. A change to the at least one resource of the virtual machine is determined. Responsive to determining the change to the at least one resource of the virtual machine, the metadata is modified. The at least one application uses the modified metadata to determine how much of the changed at least one resource of the virtual machine to use.

DETAILED DESCRIPTION

Figure 1:
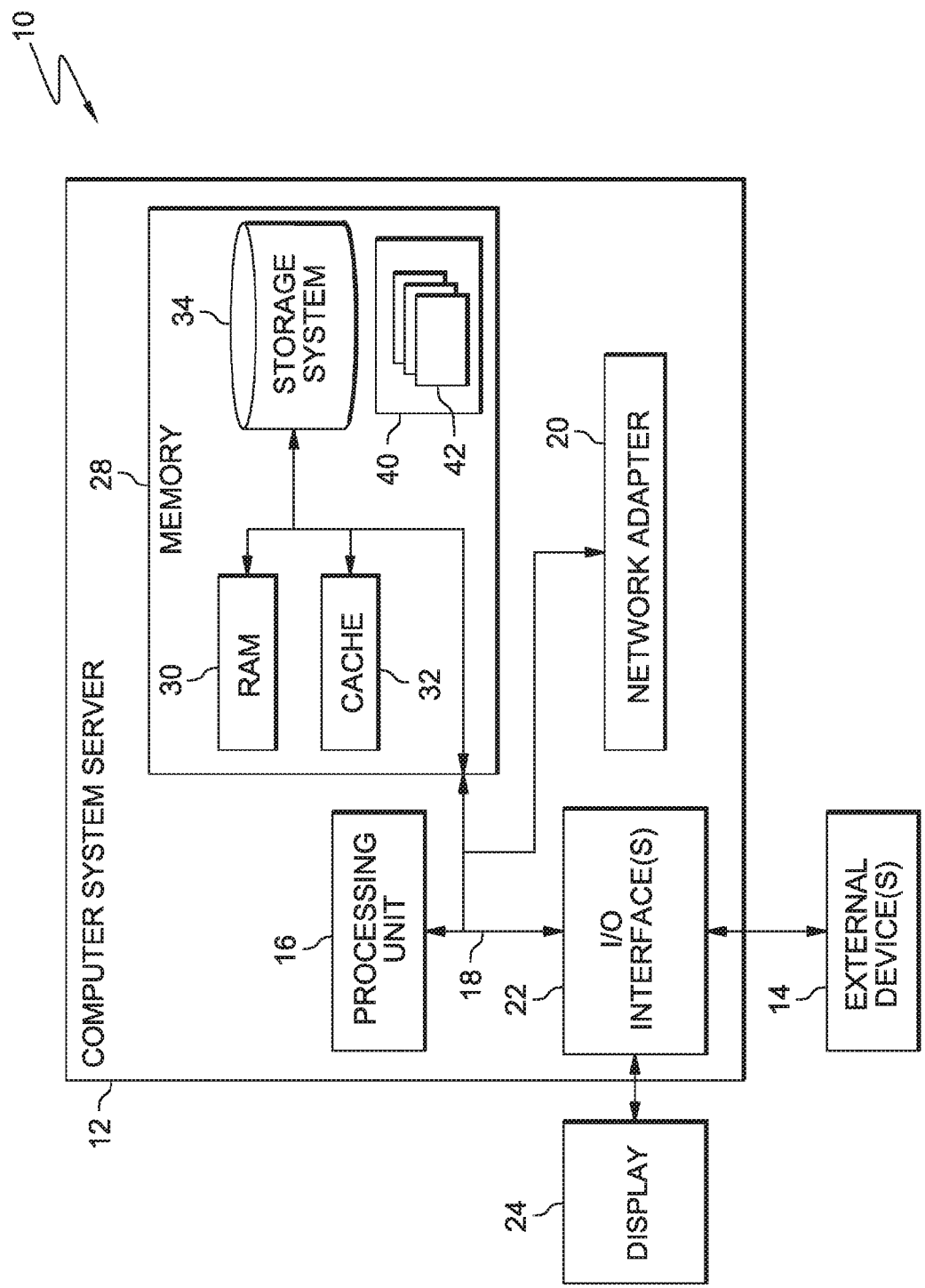
FIG. 1 depicts a cloud computing node, in accordance with an embodiment of the present invention.

Embodiments of the present invention allow for connecting a virtual machine and application(s) by providing the application(s) with the resources of virtual machine. Resources may be a central processing unit (CPU), memory, persistent storage, or any number of input/out devices. Additionally, the present invention monitors the virtual machine for any changes in resources. If there is a change in resources of the virtual machine, metadata found in the present invention is modified and application(s) can modify themselves accordingly, depending upon the resources they utilize. The metadata contains information about each of the application(s) and how they interact with the virtual machine, specifically the resources of the virtual machine.

Some embodiments of the present invention recognize that current Product As A Service (PAAS) offerings, and the like, are not currently optimized for cloud environments. Currently, all products or applications in the PAAS must be redesigned with cloud deployment in mind so as to allow the products or applications to be a truly workload optimized solutions. Additionally, the current approach has a unique problem in that, during a scale-out/scale-in scenario when virtual machine resources are dynamically changed by provisioning/de-provisioning resources, there are no ways that these additional resources are consumed by the products or applications without the input of a human, for example a product administrator.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
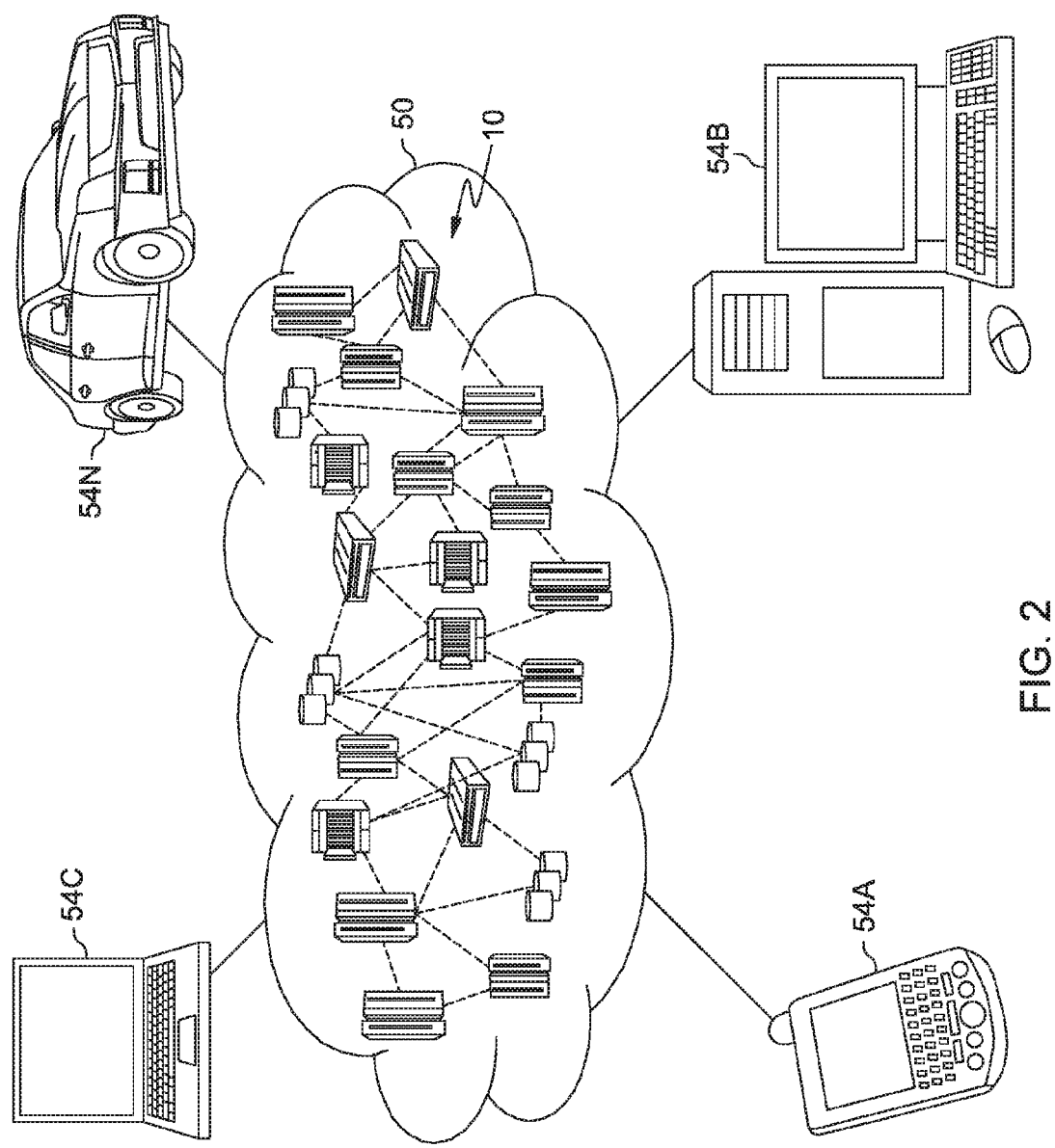
FIG. 2 depicts a cloud computing environment, in accordance with an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
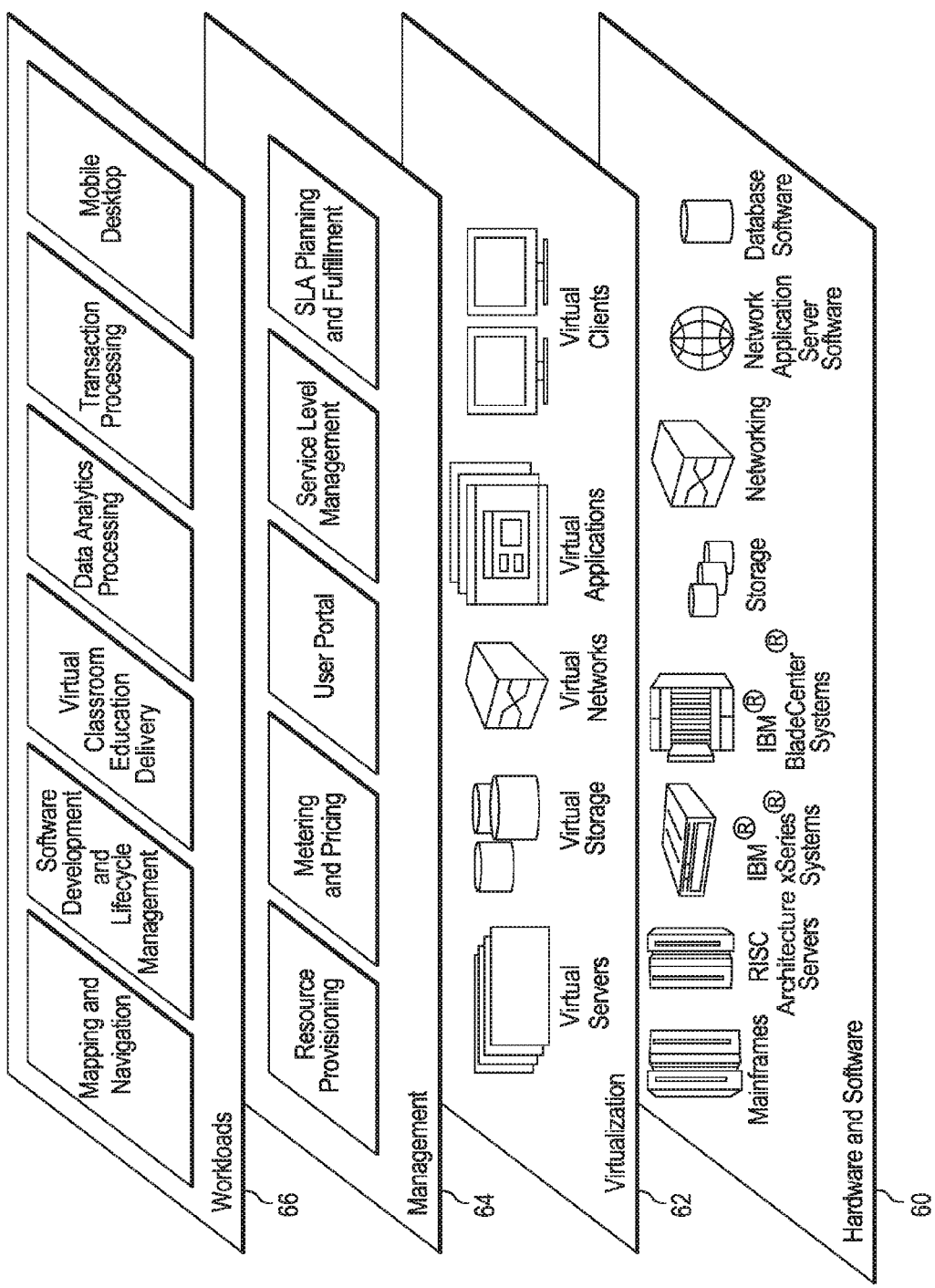
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
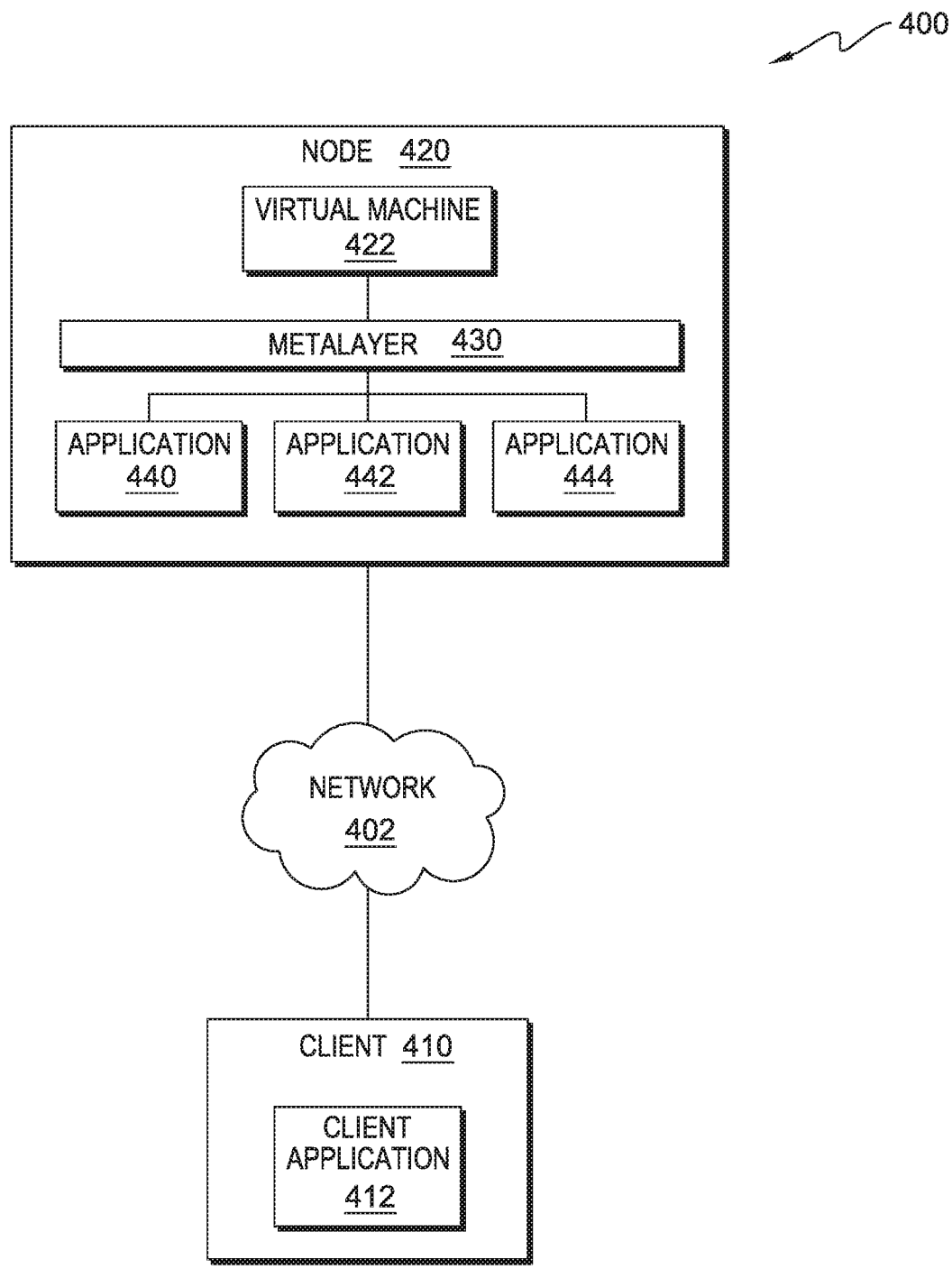
FIG. 4 depicts a functional block diagram of a data processing environment, in accordance with an embodiment of the present invention.

FIG. 4 is a functional block diagram illustrating a data processing environment, generally designated 400, in accordance with one embodiment of the present invention. FIG. 4 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 400 includes client computer 410, node 420, interconnected over network 402. Network 402 can be, for example, a local area network (LAN), a telecommunications network, a wide area network (WAN) such as the Internet, or any combination of the three, and include wired, wireless, or fiber optic connections. In general, network 402 can be any combination of connections and protocols that will support communications between client computer 410, node 420, and any other computer connected to network 402, in accordance with embodiments of the present invention.

In example embodiments, computer 410 and node 420 may be a laptop, tablet, or netbook personal computer (PC), a desktop computer, a personal digital assistant (PDA), a smart phone, or any programmable electronic device capable of communicating with any computing device within data processing environment 400. In certain embodiments, computer 410 collectively represents a computer system utilizing clustered computers and components (e.g., database server computers, application server computers, etc.) that act as a single pool of seamless resources when accessed by elements of data processing environment 400, such as in a cloud computing environment. In general, computer 410 is representative of any electronic device or combination of electronic devices capable of executing computer readable program instructions. Computer 410 may include components as depicted and described in detail with respect to cloud computing node 10, as described in reference to FIG. 1, in accordance with embodiments of the present invention.

Client computer 410 includes client application 412. In an embodiment, client application 412 is a program, application, or subprogram of a larger program that allows a user of computer to view and communicate with any application found on node 420, discussed in depth later. Client application 412 may be similar to a user interface. A user interface (not shown) is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. For example, client application may be a web browser, an email program, etc.

Node 420 includes virtual machine 422, metalayer 430 and application(s) 440, 442, 444. In an embodiment, virtual machine 422 is an emulation of a particular computer system, in this case node 420. In an embodiment, metalayer 430 is a program, application, or subprogram of a larger program that bridges the virtual machine 422 and the product offering, application(s) 440, 442, 444, by determining the resources from virtual machine 422 that are needed by application(s) 440, 442, 444 upon setup of data processing environment 400 and notifies application(s) 440, 442, 444 of any resource changes to virtual machine 422. Metalayer 430 is a program representative of program 40, as described in reference to FIG. 1, in accordance with embodiments of the present invention. Application(s) 440, 442, 444 may be any application found in a platform as a service (PaaS), Software as a Service (SaaS), and Infrastructure as a Service (IaaS) offering, including, but not limited to, facilities for application design, application development, testing, and deployment as well as services such as team collaboration, web service integration, and marshalling, database integration, security, scalability, storage, persistence, state management, application versioning, application instrumentation, developer community facilitation and service management (including monitoring, workflow management, discovery, reservation, etc.).

In an embodiment, as shown, virtual machine 422 is connected to metalayer 430. In an alternative embodiment, virtual machines 422 may be any number of virtual machines located on any number of nodes. In an embodiment, virtual machine 422 may be created by a hypervisor (not shown). In an alternative embodiment, virtual machine 422 may be created by a function of the operating system found on node 420.

A hypervisor provides the ability to divide physical computing system resources into isolated logical partitions. Logical partitioning is the ability to logically divide a real, or physical, server into two or more independent virtual servers, and one or more applications execute in each virtual machine or logical partition as if the virtual machine 422 or logical partition was a separate physical computer. Each logical partition, also called a virtual system, virtual server, or virtual machine, operates like an independent computing system running its own operating system. Hypervisors can allocate dedicated processors, I/O adapters, and memory to each virtual machine and can also allocate shared processors to each virtual machine. In some manners of virtualization, the hypervisor creates a shared processor pool from which the hypervisor allocates time slices of virtual processors to the virtual machines according to predetermined allocation percentages. In other words, the hypervisor creates virtual processors from physical processors so that virtual machines can share the physical processors, which includes sharing cache space and memory bandwidth, while running independent operating environments.

In addition to creating and managing the virtual machines, the hypervisor manages communication between the virtual machines via a virtual network. To facilitate communication, each virtual machine may have a virtual adapter for communication between the virtual machines, via the virtual network and with other computing or storage devices within a computing system via a real network. The type of the virtual adapter depends on the operating system used by the virtual machine. Examples of virtual adapters include virtual Ethernet adapters, virtual Fiber Channel adapters, virtual Small Computer Serial Interface (SCSI) adapters, and virtual serial adapters.

In an embodiment, metalayer 430 is a program, application, or subprogram of a larger program that connects virtual machine 422 and application(s) 440, 442, 444 by providing the application(s) 440, 442, 444 with the resources of virtual machine 422. Resources of virtual machine 422 may be a central processing unit (CPU), memory, persistent storage, or any number of input/out devices. Additionally, metalayer 430 monitors virtual machine 422 for any changes in resources. If there is a change in resources of virtual machine 422, metadata found in the metalayer 430 is used to tune the configuration of application(s) 440, 442, 444, depending upon the resources they utilize. The metadata contains information about each of the application(s) 440, 442, 444 and how they interact with virtual machine 422, specifically the resources of virtual machine 422. This metadata can be injected into the metalayer 430 in multiple ways including by the application, administrator or another program. Metalayer 430 may be found in the management layer 64, as described in reference to FIG. 3, discussed previously.

In an embodiment, application(s) 440, 442, 444 may be any application found in a platform as a service (PaaS), Software as a Service (SaaS), and Infrastructure as a Service (IaaS) offering, including, but not limited to, facilities for application design, application development, testing, and deployment as well as services such as team collaboration, web service integration, and marshalling, database integration, security, scalability, storage, persistence, state management, application versioning, application instrumentation, developer community facilitation and service management (including monitoring, workflow management, discovery, reservation, etc.). In an alternative embodiment, there may be a single application 440. In yet another alternative embodiment, there may be any number of applications or there may be applications that run as a function of other applications. When application(s) 440, 442, 444 is initialized, the application(s) 440, 442, 444 notifies metalayer 430 of the resources that they will need from virtual machine 422. Additionally, application 440, 442, 444 may notify metalayer 430 of any resources it may need from virtual machine 422 that are not needed all the time or not needed to run at all, but if they are made available from virtual machine 422, metalayer 430 should notify application 440, 442, 444 so the application can connect and utilize those resources.

Figure 5:
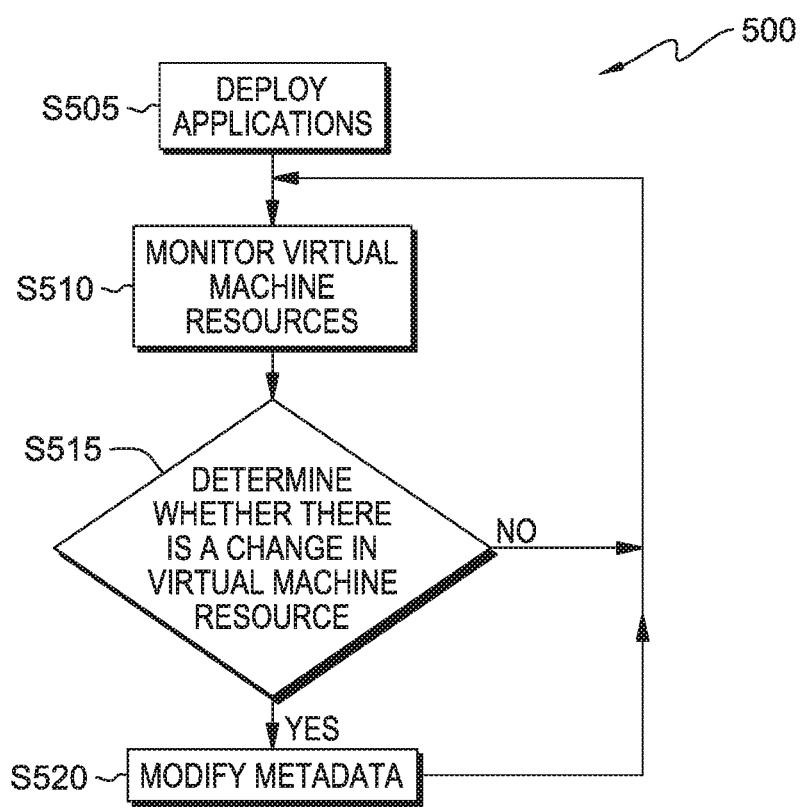
FIG. 5 depicts a flowchart of operational steps of a program for optimizing cloud resources, in accordance with an embodiment of the present invention.

FIG. 5 is a flowchart of workflow 500 depicting operational steps for automated exploitation of changes to cloud resources, in accordance with an embodiment of the present invention. In one embodiment, the steps of the workflow are performed by metalayer 430. Alternatively, steps of the workflow can be performed by any other program while working with metalayer 430. In a preferred embodiment, a user, via a user interface discussed previously, can invoke workflow 500 upon determining that they would like to setup application(s) in a virtual environment. In an alternative embodiment, workflow 500 can be invoked automatically under the control of another program, for example, upon the hypervisor, discussed previously, creating virtual machine 422 and changes to virtual machine 422 being sent to metalayer 430 to begin a step in workflow 500.

In step S505, one or more applications are deployed. In an embodiment, metalayer 430 deploys the one or more applications. In an embodiment, metalayer 430 is notified of at least one application(s) 440, 442, 444 that will be part of the data processing environment 400. In an embodiment, a user, via client application 412, may decide on a number of applications as a part of a PaaS environment. In an alternative embodiment, metalayer 430 may be notified of the at least one application(s) 440, 442, 444 from another program, as in a case of an automated scaling up of system resources upon another program determining there is a need for additional applications. For example, a PaaS environment for "Websphere Application Pattern Production" may consist of three layers. First, a webserver is used to accept end user requests and then forward the dynamic requests to a second layer, the appserver(websphere) layer. The appserver layer in turn depends on a third layer, the database layer, to fetch the data needed for request processing. In an embodiment, metalayer 430 deploys, in other words installs, the required applications on node 420. In an alternative embodiment, metalayer 430 is notified of at least one application already deployed on node 420 by another application (not shown). In an embodiment, metalayer 430 may setup virtual machine 422. In an alternative embodiment, as discussed previously, a hypervisor may have previously setup virtual machine 422.

In an embodiment, metalayer 430 determines the current resource allocation for virtual machine 422, and then using that resource information, determines what connections each application(s) 440, 442, 444 needs to make with metalayer 430 and virtual machine 422. In other words, metalayer 430 determines which resources each application needs, saves that information in metadata found in metalayer 430, and then metalayer 430 is used as an actuator or bridge between application(s) 440, 442, 444, and virtual machine 422. After determining the available resources from the virtual machine 422, metalayer 430 notes the resource allocation in metadata found in metalayer 430, and application(s) 440, 442, 444, using the information about virtual machine 422 in the metadata, are distributed resources as needed. Metalayer 430 also includes, in the metadata of metalayer, information about a "fudge factor". The "fudge factor" is used when changes to resources of virtual machine 422 are made and then the resource allocations are passed to application(s) 440, 442, 444 as a protection against overusing resources of virtual machine 422. In other words, the "fudge factor" may reduce the determined resource allocations based on the changes to the resources of the virtual machine by a small amount so as to not overburden the total available resources of virtual machine 422.

For example, in the "Websphere Application Pattern Production" environment, the resource of virtual machine 422 may be a configurable element, in other words elements that when there are changes to the resource of virtual machine 422 then the change in resources will be passed on to application(s) 440,442, 444. In this example the configurable element may be the "thread pool". The name of the resource may be "poolsize", the resource depends on the resources of the CPU, the relationship is "proportional" and the "fudge factor" is 1.

Metalayer 430 monitors the virtual machine resources (step S510). In other words, metalayer 430 will monitor virtual machine 422. In an embodiment, metalayer 430 will know the initial resource allocation to virtual machine 422 at the time of setup of application(s) 440, 442, 444. Metalayer 430 will then continue to monitor the resources of virtual machine 422 and record the resources in the metadata of metalayer 430. For example, upon setup of application(s) 440, 442, 444, the metalayer 430 may have indicated in metadata that the initial poolsize was 50 and the initial CPU size was 1. In an embodiment, virtual machine 422 indicates resource utilization updates to metalayer 430. For example, updates are sent periodically (e.g., every minute, hourly, etc.) from virtual machine 422 to metalayer 430. In an alternative example, updates are sent from virtual machine 422 to metalayer 430 any time the resources of virtual machine 422 are modified. In an alternative embodiment, metalayer 430 requests updates from virtual machine 422 periodically (e.g., every minute, hourly, etc.).

Metalayer 430 determines whether there is a change in virtual machine resources (decision block S515). In other words, are the resources of virtual machine 422 different, currently, than what they were during the setup of application(s) 440, 442, 444 or than what they were during a previous check. If there are no changes to the resources of virtual machine 422 (decision block S515, no branch), metalayer 430 continues to monitor virtual machine resources (step S510). In an embodiment, metalayer 430 determines whether there is a change periodically (e.g., every minute, hourly, etc.). In an alternative embodiment, metalayer 430 determined whether there is a change when metalayer 430 receives a resource modification from virtual machine 422, discussed previously.

If there are changes to the resources of virtual machine 422 (decision block S515, yes branch), metalayer 430 modifies the metadata found in metalayer 430 (step S520). In other words, metalayer 430 will change the information in the metadata about the resource that was changed in virtual machine 422. For example, if CPU number is changed to 2, this is different than the CPU number of 1 stored in metadata in the previously discussed example. Metalayer 430, using these changes, may determine a new poolsize using a predefined equation. For example, the following equation "#newpoolsize=oldpoolsize*(newCPU/oldCPU)*(1−fudgefactor) may be used. In the previously discussed example, this equation would end up calculating #newpoolsize to be 90 based upon this calculation "#newpoolsize=50*(2/1)*(1−0.1). Once metalayer 430 has calculated the poolsize, this information is updated in the metadata, and application(s) 440, 442, 444 now utilize the updated metadata to use the increased or decreased amount of resources.

In an embodiment, a typical distributed application architecture may consist of a number of applications working together. Each application may be dependent on another application, in other words, upstream applications may depend on the workload of downstream applications and vice versa. Each application may get the resources needed to perform operations from individual virtual machines. As changes are made to the resource requirements of an application of a certain virtual machine, this may change the resource requirements of another application using a different virtual machine. For example, VM1 (virtual machine #1) provides resources to APP1 (application #1) and VM2 provides resources to APP2. APP1 and APP2 communicate with VM1 and VM2, respectively, using the same metalayer described above. APP1 and APP2 work together to perform a service and therefore if APP1's workload increases, APP2's workload may need to increase as well. If there is a change in APP1's workload that causes changes to the resource requirements needed from VM1, the workload of APP2 will change accordingly and the resource requirements needed from VM2 will change as well. The metalayer that communicates between APP1 and VM1 will communicate with the metalayer that communicates between APP2 and VM2 to automatically adjust the resource allocations to fulfill any increase or decrease in resource requirements. In an embodiment, this can be aided by the use of a VM Graph that is a group of virtual machines that connect related applications to optimize resource allocation.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for automated exploitation of virtual machine resource modifications, the computer program product comprising:
   one or more computer readable storage media; and
   program instructions stored on the one or more computer readable storage media, the program instructions comprising:
   program instructions to deploy at least one application in a distributed computing environment;
   program instructions to provide at least one resource of a virtual machine to the at least one application in the distributed computing environment, wherein the at least one resource of the virtual machine provided is recorded in metadata and the at least one application receives the metadata and using the metadata the at least one application determines how much of the at least one resource of the virtual machine to utilize;
   program instructions to determine a change to the at least one resource of the virtual machine, wherein a metalayer monitors the virtual machine for any changes in the at least one resource; and
   program instructions to, in response to determining a change to the at least one resource of the virtual machine, modify the metadata by the metalayer, wherein the at least one application uses the modified metadata to determine how much of the changed at least one resource of the virtual machine to utilize by the metalayer;
   program instructions to, automatically providing by the metalayer at least one of the changed resources to the virtual machine to fulfill any increase or decrease in resource requirements.

2. The computer program product of claim 1, wherein the at least one resources is at least one of: central processing unit, memory, persistent storage, input device, and output device.

3. The computer program product of claim 1, wherein the at least one application is at least one of: an application in a platform as a service environment, an application in a software as a service environment, and an application in an infrastructure as a service offering.

4. The computer program product of claim 1, further comprising program instructions, stored on the one or more computer readable storage media, to:
   deploy another application in the distributed computing environment;
   provide at least one resource of a second virtual machine to the another application in the distributed computing environment, wherein the at least one resource of the second virtual machine provided is recorded in a second metadata and the another application receives the second metadata and using the second metadata the another application determines how much of the at least one resource of the second virtual machine to utilize;
   responsive to modifying the metadata, modify the second metadata; and
   responsive to modifying the second metadata, provide the at least one resource of the second virtual machine to the another application in the distributed computing environment, wherein the another application receives the modified second metadata and using the modified second modified metadata the another application determines how much of the at least one resource of the second virtual machine to utilize.

5. The computer program product of claim 1, wherein the change to the at least one resource of the virtual machine is one of: an increase to the at least one resource of the virtual machine or a decrease to the at least one resource of the virtual machine.

6. A computer system for providing automated exploitation of virtual machine resource modifications, the computer system comprising:
   one or more computer processors;
   one or more computer readable storage media; and
   program instructions, stored on the one or more computer readable storage media for execution by at least one of the one or more computer processors, the program instructions comprising:
   program instructions to deploy at least one application in a distributed computing environment; program instructions to provide at least one resource of a virtual machine to the at least one application in the distributed computing environment, wherein the at least one resource of the virtual machine provided is recorded in metadata and the at least one application receives the metadata and using the metadata the at least one application determines how much of the at least one resource of the virtual machine to utilize;
   program instructions to determine a change to the at least one resource of the virtual machine, wherein a metalayer monitors the virtual machine for any changes in the at least one resource; and
   program instructions to, in response to determining a change to the at least one resource of the virtual machine, modify the metadata by the metalayer, wherein the at least one application uses the modified metadata to determine how much of the changed at least one resource of the virtual machine to utilize by the metalayer;

program instructions to, automatically providing by the metalayer at least one of the changed resources to the virtual machine to fulfill any increase or decrease in resource requirements.

7. The computer system of claim 6, wherein the at least one resources is at least one of: central processing unit, memory, persistent storage, input device, and output device.

8. The computer system of claim 6, wherein the at least one application is at least one of: an application in a platform as a service environment, an application in a software as a service environment, and an application in an infrastructure as a service offering.

9. The computer system of claim 6, further comprising program instructions, stored on the one or more computer readable storage media for execution by at least one of the one or more computer processors, to:

deploy another application in the distributed computing environment;

provide at least one resource of a second virtual machine to the another application in the distributed computing environment, wherein the at least one resource of the second virtual machine provided is recorded in a second metadata and the another application receives the second metadata and using the second metadata the another application determines how much of the at least one resource of the second virtual machine to utilize;

responsive to modifying the metadata, modify the second metadata; and responsive to modifying the second metadata, provide the at least one resource of the second virtual machine to the another application in the distributed computing environment, wherein the another application receives the modified second metadata and using the modified second modified metadata the another application determines how much of the at least one resource of the second virtual machine to utilize.

10. The computer system of claim 6, wherein the change to the at least one resource of the virtual machine is one of: an increase to the at least one resource of the virtual machine or a decrease to the at least one resource of the virtual machine.

\* \* \* \* \*